(12) United States Patent
Bala et al.

(10) Patent No.: US 7,760,934 B2
(45) Date of Patent: *Jul. 20, 2010

(54) COLOR TO GRAYSCALE CONVERSION METHOD AND APPARATUS UTILIZING A HIGH PASS FILTERED CHROMINANCE COMPONENT

(75) Inventors: Raja Bala, Webster, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/058,567

(22) Filed: Mar. 28, 2008

(65) Prior Publication Data
US 2008/0181491 A1    Jul. 31, 2008

Related U.S. Application Data

(63) Continuation of application No. 10/802,130, filed on Mar. 16, 2004, now Pat. No. 7,382,915.

(51) Int. Cl.
*G06K 9/00* (2006.01)
(52) U.S. Cl. ..................................... 382/162
(58) Field of Classification Search .............. 382/162
See application file for complete search history.

(56) References Cited

U.S. PATENT DOCUMENTS

| | | | |
|---|---|---|---|
| 4,257,070 A | | 3/1981 | Sommer et al. |
| 4,266,241 A | * | 5/1981 | Hjortzberg .................. 386/16 |
| 4,291,331 A | | 9/1981 | Devereux |
| 4,308,553 A | | 12/1981 | Roetling |
| 4,688,031 A | | 8/1987 | Haggerty |
| 4,882,626 A | | 11/1989 | Fling et al. |
| 4,977,398 A | | 12/1990 | Pleva et al. |
| 5,012,333 A | * | 4/1991 | Lee et al. ..................... 358/520 |
| 5,146,319 A | | 9/1992 | Engel et al. |
| 5,153,576 A | | 10/1992 | Harrington |

(Continued)

FOREIGN PATENT DOCUMENTS

JP    S63-198483 A    8/1988

(Continued)

OTHER PUBLICATIONS

Gamut Mapping to Preserve Spatial Luminance Variations, The Journal of Imaging Science and Technology Sep./Oct. 2001, vol. 45, No. 5, pp. 436-443.*

(Continued)

*Primary Examiner*—Bhavesh M Mehta
*Assistant Examiner*—David P Rashid
(74) *Attorney, Agent, or Firm*—Pillsbury Winthrop Shaw Pittman LLP

(57) ABSTRACT

A method and apparatus for translating color to grayscale images, wherein at least some pixels of the color image having the same color are mapped to different grays in the grayscale image depending on the spatial surround of each pixel. Further, the method and apparatus may include applying a high pass filter to at least one chrominance component of a color image to generate at least one high pass filtered chrominance component, and adjusting a luminance component of the color image based upon the at least one high pass filtered chrominance component.

17 Claims, 5 Drawing Sheets

U.S. PATENT DOCUMENTS

| | | | |
|---|---|---|---|
| 5,245,327 A | | 9/1993 | Pleva et al. |
| 5,333,014 A | | 7/1994 | Drewery et al. |
| 5,434,627 A | * | 7/1995 | Weston .................. 348/609 |
| 5,450,216 A | | 9/1995 | Kasson |
| 5,592,310 A | | 1/1997 | Sugiura |
| 5,631,970 A | * | 5/1997 | Hsu .................. 382/113 |
| 5,701,401 A | | 12/1997 | Harrington et al. |
| 5,726,781 A | | 3/1998 | Isemura et al. |
| 5,742,710 A | * | 4/1998 | Hsu et al. .................. 382/236 |
| 5,898,819 A | | 4/1999 | Austin et al. |
| 5,987,169 A | * | 11/1999 | Daly et al. .................. 382/167 |
| 6,002,794 A | * | 12/1999 | Bonneau et al. .................. 382/166 |
| 6,084,989 A | * | 7/2000 | Eppler .................. 382/293 |
| 6,101,272 A | | 8/2000 | Noguchi |
| 6,115,138 A | * | 9/2000 | Yanaka .................. 358/1.9 |
| 6,259,822 B1 | * | 7/2001 | Hamilton et al. .................. 382/266 |
| 6,347,156 B1 | * | 2/2002 | Kamada et al. .................. 382/237 |
| 6,518,948 B1 | * | 2/2003 | Berstis .................. 345/107 |
| 6,646,762 B1 | | 11/2003 | Balasubramanian et al. |
| 2003/0197674 A1 | * | 10/2003 | Herrmann .................. 345/102 |

FOREIGN PATENT DOCUMENTS

| | | |
|---|---|---|
| JP | H03-291090 A | 12/1991 |

OTHER PUBLICATIONS

U.S. Appl. No. 10/674,048, filed Sep. 29, 2003; DeQueiroz et al; "Method for Embedding Color Image Information into a Black-and-White Image".

U.S. Appl. No. 10/465,437, filed Jun. 19, 2003; Braun et al; "A Method for Converting Color to Monochrome to Maintain Differentiability".

Japanese Office Action for Japanese Patent Application No. 2005-70269, mailed on Sep. 29, 2009.

\* cited by examiner

COLOR TO GRAYSCALE CONVERSION METHOD AND APPARATUS UTILIZING A HIGH PASS FILTERED CHROMINANCE COMPONENT

This application is a continuation of co-assigned U.S. patent application Ser. No. 10/802,130, now U.S. Pat. Ser. No. 7,382,915 B2, filed Mar. 16, 2004 and issued Jun. 3, 2008, to Raja Bala et al. for "Color for Grayscale Conversion and Method and Apparatus," the contents of which are incorporated herein by reference and made a part hereof.

The presently disclosed method and apparatus relates to digital imaging and especially to a method for converting color images into grayscale images.

A color image sent to a monochrome output device should undergo a color-to-grayscale transformation. Such a transform typically retains the luminance channel or a derivative thereof. A problem with this approach is that the distinction between two different colors of similar luminance is lost. This loss can be particularly objectionable if the two colors are spatially adjacent.

Considerable effort has been spent in finding a better color to grayscale transformation. Many of these techniques have their own flaws. Mappings based only on color information suffer from a "many-to-one" mapping problem. Also, attempts to take the Helmholtz-Kohlrausch effect into account (saturated colors appear lighter) have shown no systematic improvement. Previous methods have also included converting color palettes to texture to preserve distinction among different colors. While texture-based approaches can be quite effective in preserving distinction for certain types of images (e.g., graphics with regions of constant color), their global nature may not be desirable in some cases. For example, introduction of texture into smooth fleshtone regions in a portrait most commonly produces an undesirable appearance.

Other approaches map a fixed palette of colors to grayscale by preserving relative 3-D color differences along the 1-D luminance axis. While this is an effective technique for business graphics having few colors, it does not readily extend to the general case of pictorial imagery or complex graphics with smoothly varying sweeps.

The method proposed in this disclosure uses the same underlying principle of spatial color processing as the gamut mapping method disclosed in U.S. Pat. No. 6,621,923, hereby incorporated by reference. In the '923 patent a method of spatial gamut mapping is described that preserves local luminance edge information lost from the gamut-mapping step, thereby making the actual color mapping a space variant function, which we refer to as "spatial mapping," indicating that color, as well as neighborhood information is used in the processing step. The disclosed method describes computing the difference between the original and gamut-mapped luminance image, processing through a high-pass filter, and adding this back to the gamut-mapped luminance. The embodiments disclosed herein are based on a similar idea of feeding information lost in the color to grayscale mapping back into the system. However, it pays attention to errors originating from the mapping of color edges rather than pure luminance attributes. For simplicity, one might derive this error as a function of chrominance edges, thereby separating the maintained luminance edge information. It should be understood that here and in the following we are using the term luminance and chrominance to indicate a general description based on a color space that has one component along an axis that might be considered a "good" black and white representation of the input data, and two axes along directions that are indicative of color. Examples of such spaces are Lab, YCrCb, XeroxYES and the like.

To improve the quality of grayscale images created from a color image, at least some pixels of the color image having the same color are mapped to different grays in the grayscale image depending on the spatial surround of each pixel.

The method disclosed herein locally preserves the distinction between adjacent colors (i.e., along color edges) by introducing high-frequency chrominance information into the luminance channel. High frequency chrominance information corresponds to color edges. In embodiments, a high-pass filter is used as an efficient edge indicator. Embodiments include applying a high-pass filter to the chrominance components of a color image and using the result to modify the luminance channel of the image. Embodiments also include weighting the output with a luminance-dependent term. Other embodiments might use different linear or non-linear filters, including logical filters, as long as the filter output is indicative of edge location and magnitude.

Embodiments also include a system for converting a color image to a grayscale image. The system includes an image input device that receives a color image having luminance and chrominance components, an edge detector including a high pass filter for computing high-pass filtered chrominance components from the received chrominance components, a feedback unit, which modifies the luminance component based upon the high-pass filtered chrominance components, and an output device, that receives the modified luminance component and outputs a grayscale image based upon the modified luminance component.

Embodiments also include a grayscale image created from a color image, wherein at least some pixels of the color image having the same color are mapped to different grays in the grayscale image depending on the spatial surround of each pixel.

Embodiments also include a method for improving a color to grayscale transformation of an image composed of a plurality of pixels. The method includes selecting a subset of the plurality of pixels based upon at least one predetermined criterion derived from a local spatial neighborhood of the plurality of pixels, adjusting the luminance components of each of the subset of the plurality of pixels based upon the chrominance information of the same plurality of pixels, generating an output image based upon the adjusted luminance component. In embodiments, the predetermined criterion includes only selecting pixels in close proximity to an edge.

Various exemplary embodiments will be described in detail, with reference to the following figures, wherein.

Figure 5:
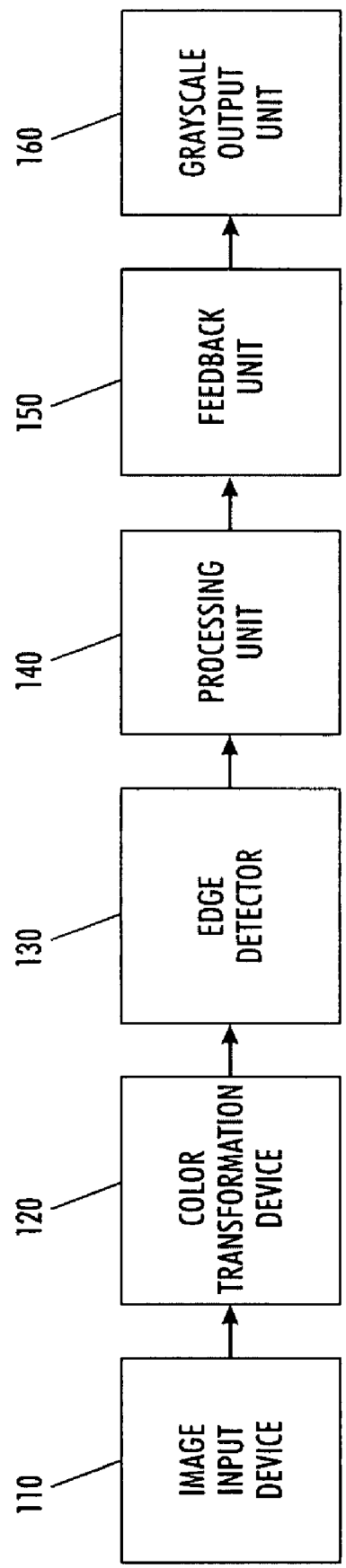

FIG. 5 schematically illustrates a color to grayscale conversion system.

The following description discloses a method of improving edges and details in grayscale versions of color images.

Figure 1:
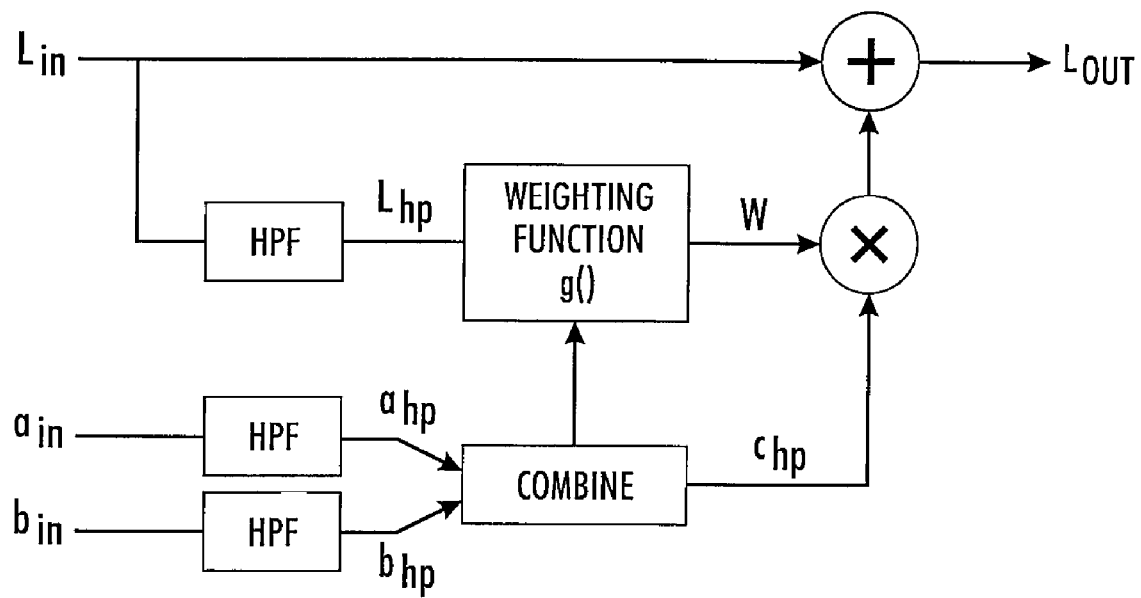
FIG. 1 is a block diagram of a method for color to grayscale conversion.

Reference is now made to FIG. 1. To use the method disclosed herein, the information from a color image needs to be in a luminance-chrominance representation, such as L*a*b*, YES, YCbCr, etc. If the image is in an RGB space, it should be first converted to such a luminance-chrominance representation for simplicity of edge calculation. The particular luminance-chrominance representation used should not matter. While the rest of the description uses a L*a*b* representation, the method should work with data in any luminance-chrominance representation.

Converting color images to grayscale images typically involves passing the luminance component, L*, of the image directly to the output device with the necessary processing required to convert L* into a device dependent signal. In the case of a printer, for example, the latter is usually the black colorant.

To improve the output, the first step of the algorithm computes high-pass filtered versions of all three channels. These will be denoted as $L_{hp}$, $a_{hp}$, and $b_{hp}$. The high-pass filters are used to isolate the information regarding luminance and chrominance edges where the frequencies are going to be largest. The particular frequency cutoff and the particular filter used will vary based upon, for example, the input image, the processor being used, and the output device.

In embodiments, the chrominance components of the image are then combined into a single signal $c_{hp}$ that represents high-frequency chrominance information. One candidate is the Euclidean metric:

$$c_{hp} = \sqrt{a_{hp}^2 + b_{hp}^2} \tag{1}$$

In order to lessen computational time, an alternative combined chrominance component could be used, such as the computationally simpler 1-norm metric:

$$c_{hp} = |a_{hp}| + |b_{hp}| \tag{2}$$

In embodiments, the signal $c_{hp}$ is then multiplied by a weight factor w that is a function of the high-pass luminance signal $L_{hp}$. This weight factor, denoted $w = g(L_{hp})$, is chosen with two criteria in mind: (1) to use the chrominance information only to enhance edges, and not to weaken them, and (2) to introduce the chrominance variation only at locations where the luminance variation is not sufficient to distinguish the local image variation. To satisfy the aforementioned two criteria, the chosen weighting function is given by:

$$w = g(L_{hp}) = \text{sign}(L_{hp}) \times \text{sign}(c_{hp}) \times f(|L_{hp}|) \tag{3}$$

wherein the sign-functions and the f-function deal with the first and second criteria, respectively.

In embodiments, the first criterion is resolved using a "sign function," applied to $L_{hp}$ and $c_{hp}$. In embodiments, sign(x) takes on a value of +1 when x≧0, and −1 when x<0. The sign function is applied to high-pass-filtered luminance and chrominance components at each pixel. Using such a function, the high-pass filtered chrominance information is used to modify the luminance information only so as to enhance the luminance variation. The polarity or sign of the high-pass chrominance correction is adjusted, via the sign functions, to match that of the high-pass luminance signal. Specifically, before the high-pass-filtered chrominance information is used to modify the luminance signal, the high-pass-filtered chrominance information is multiplied by both sign($L_{hp}$) and sign($c_{hp}$). This ensures that the high-pass-filtered chrominance information will have the same sign as the high-pass-filtered luminance information at an edge and therefore will only enhance the edge, rather than reduce it.

By way of example, consider the scenario shown in FIG. 2 where an edge in an image is made up of variations in both luminance 2(a) and chrominance 2(d), but in opposite polarities. (This is a very common occurrence; e.g., at an edge between white and a colorful region; the white side would be of greater luminance, but the colorful region would have a higher chrominance.) The high-pass luminance signal $L_{hp}(x)$ and its corresponding sign function in the vicinity of the edge are shown in FIGS. 2(b) and 2(c) respectively. The high-pass chrominance signal $c_{hp}$ and its corresponding sign function in the vicinity of the edge are shown in FIGS. 2(e) and 2(f) respectively. Adding the high-pass chrominance signal 2(e) directly to the luminance signal in FIG. 2(a) would actually smoothen rather than enhance the luminance signal. To avoid this, the sign of the high-pass luminance signal $L_{hp}$ (FIG. 2c) is multiplied by the sign of the high-pass chrominance signal (FIG. 2f). This results in the overall sign function being −1 everywhere in the vicinity of this edge. Multiplying the high-pass chrominance signal in FIG. 2(e) by the overall sign function thereby effectively inverts it so that its polarity matches that of the high-pass luminance signal of FIG. 2b. This inverted high-pass chrominance signal is then added to the original luminance signal in FIG. 2(a).

Figure 3:
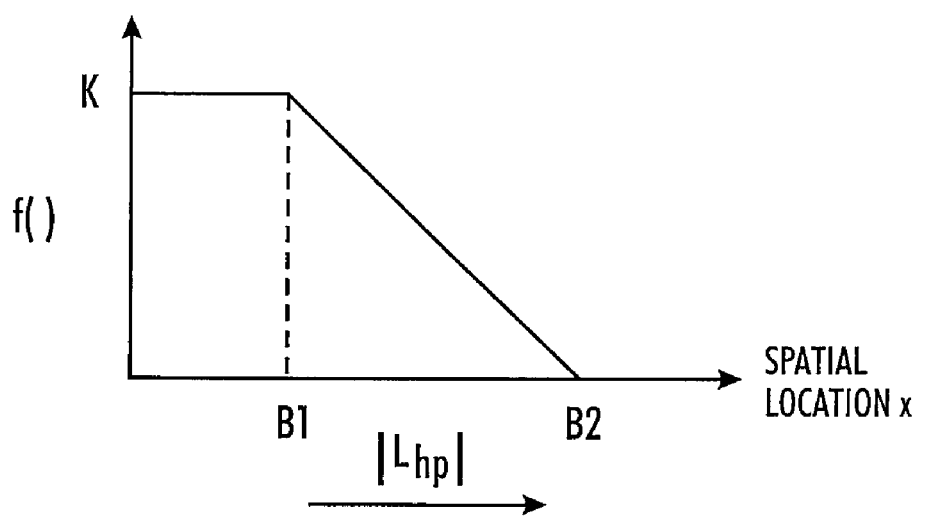
FIG. 3 illustrates exemplary function $f(L_{hp})$ used to compute a chrominance weighting factor.
Figure 2A:
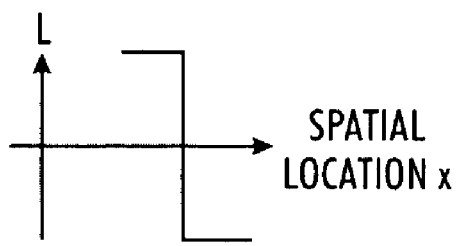
FIG. 2 illustrates the interaction between luminance and chrominance edges.
Figure 2B:
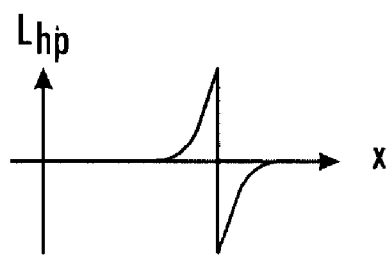
Figure 2C:
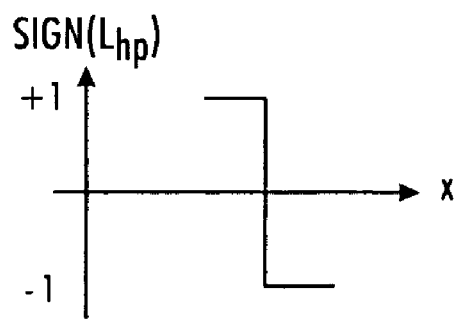
Figure 2D:
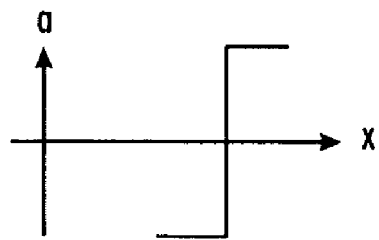
Figure 2E:
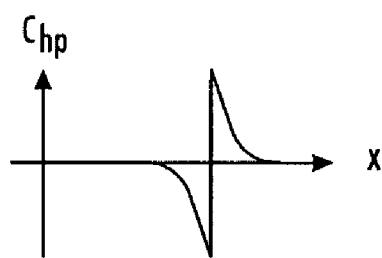
Figure 2F:
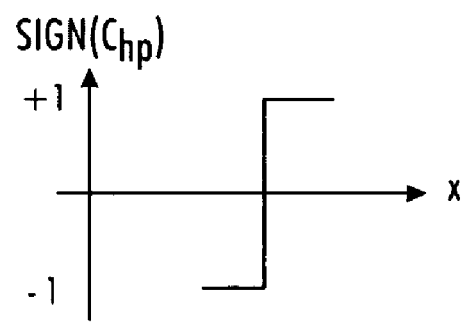

A number of functions may be used to resolve the second criterion, i.e., introduce the chrominance variation only in "areas" where the luminance variation is not sufficient to distinguish the local image variation. To achieve this, the amount of chrominance feedback is reduced when the luminance variation is large. Reducing the amount of chrominance feedback when the luminance variation is large is a conservative strategy that avoids excessive edge enhancement in regions that show sufficient detail. FIG. 3 illustrates one of many embodiments of a function f that may be used. Parameters K, B1, and B2 control the amount of luminance edge enhancement as a function of the strength of the luminance edge in the original color image. The individual parameters of the function will depend on, for example, the desired output, and the particular qualities of the output device. Moreover, many functions can be chosen that fulfill the desired characteristics of a monotonically non-increasing function. The form of the f-function will be dependent on multiple factors, such as, for example, the printer or display device that will generate the grayscale image. However, function f should be solely dependent upon the magnitude of the high-pass-filtered luminance signal, denoted $|L_{hp}|$, and not its polarity.

In embodiments, an optional processing of $c_{hp}$ is also advantageously performed to reduce noise and noise sensitivity. In areas where the chrominance edge indication is small, i.e., $c_{hp}$ is very small, setting $c_{hp}$ to zero could eliminate the feedback. This would prevent chrominance noise from leaking into the luminance channel.

During experiments, color images were used for evaluating the method outlined above. The color prints were generated on a color-characterized Xerox Phaser 7700 printer. In both cases, the L* image was printed using only black toner on the Phaser 7700, simulating a grayscale device. For the chosen prints and printer, the parameters of the weighting function $f(L_{hp})$ were chosen as K=1, B1=15, and B2=40 and arrived at on an empirical basis. Larger values of the parameters K, B1, B2 result in more aggressive enhancement of high frequencies. The high-pass filters for the chrominance error filtering were chosen based on the filters used in the '923 patent. For three pictorials, a simple 15×15 high-pass filter was used. For the text image, a smaller 5×5 high-pass filter was found to be more effective. Custom tuning of the various parameters will likely give additional improvements and would be made as a function of the output device, customer preferences, etc.

The embodiments discussed herein describe a method for enhancing edges of an image when the image is converted from color to grayscale. The method comprises adjusting a luminance component of a subset of the plurality of pixels constituting the image based upon the chrominance information of those same pixels and generating an output image based upon the adjusted luminance component. The subset of the plurality of pixels is proximate to an edge between one object and another and pixels not proximate to the edge are not adjusted.

Figure 4:
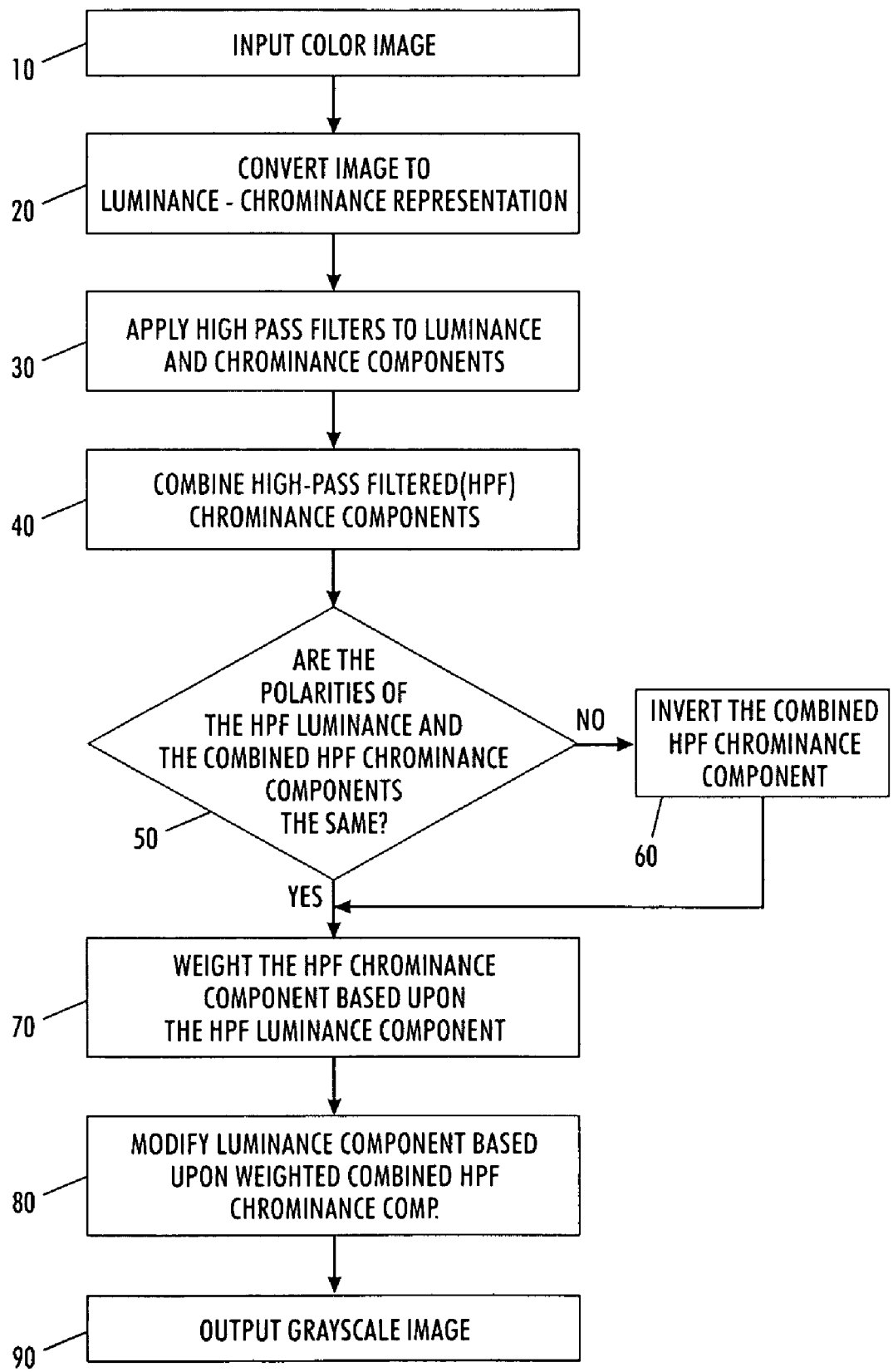
FIG. 4 is a flowchart of a method for converting color images to grayscale images.

FIG. 4 illustrates a flow chart of an embodiment of the method disclosed herein. The exact order of the steps outlined in this flowchart is not required. Additionally, some steps might be conditionally omitted based on the outcomes of previous steps. First, an image input device receives 10 a color image. The image is then converted 20 into a luminance-chrominance space. The input device can do this conversion or it can be done by another device to which the input signal is sent. High-pass filters are then applied 30 to the luminance and chrominance components. In embodiments, the high-pass filtered chrominance components are then combined 40 into a single component. The combined high-pass filtered chrominance component is then weighted. First, the polarities of the combined high-pass-filtered chrominance component and the high-pass-filtered luminance component are compared 50 and if the polarity of the combined high-pass-filtered chrominance component does not match that of the high-pass-filtered luminance component, the combined high-pass-filtered chrominance component is inverted 60. Whether or not the combined high-pass-filtered chrominance component is inverted, the combined high pass filtered chrominance component is then multiplied 70 by a weight factor based upon the magnitude of the high-pass-filtered luminance component and, in embodiments, the magnitude of the high-pass-filtered chrominance component. The weight factor is smaller where the high-pass filtered luminance component is large, the weight factor is larger where the high-pass filtered luminance component is small. The weighted combined high-pass filtered chrominance component is then used 80 to modify the luminance component. The modified luminance signal is then sent to the output device, which outputs 90 a grayscale image.

FIG. 5 schematically shows an apparatus for accomplishing the method disclosed herein. An image input device 110 would be the source of data corresponding to a color image. The image input device could be, for example, a color scanner, a personal computer or workstation with appropriate document or image creation software, a camera or a data storage device. If necessary, the color image data is then sent to a color transformation device 120 where it is converted to a luminance-chrominance representation. The color transformation device 120 can take various forms and operational details, such as, for example, software running on a processor, or an ASIC. It may also be a component of the image input device, the color transformation device could be part of the image input device 110. Next, the luminance and chrominance signals pass through an edge detector 130. The edge detector 130 uses high-pass filters to determine the luminance and chrominance edges in the original color image. In embodiments, the initial luminance signal and the high-pass filtered luminance and chrominance signals are then sent on to a processing unit 140. The processing unit 140 may be hardwired circuitry or software running on a processor. The processing unit 140 compares the polarity of the high-pass filtered luminance signal and the high-pass filtered chrominance signal to determine an overall polarity correction for the high-pass-filtered chrominance signal. The processing unit may also weight the high-pass-filtered chrominance signal based upon the magnitude of the high-pass-filtered luminance signal. The luminance signal and the weighted high-pass-filtered chrominance signal are then sent to a feedback unit 150. The feedback unit 150 modifies the luminance signal based upon the weighted HPF chrominance signal. The modified luminance signal is then sent to grayscale output unit 160. Grayscale output unit 160 could be, for example, a printer, a display screen (such as, for example, on a telephone or PDA), facsimile machine, or electric paper.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention. All patent applications, patents and other publications cited herein are incorporated by reference in their entirety.

We claim the following:

1. A method for converting a color image to a monochrome image that takes into account chrominance variations, the method comprising:

receiving the color image via an image input device;

converting the color image into an original luminance component and one or more chrominance components using a color transformation device;

high pass filtering at least one chrominance component of the color image using one or more high pass filters to compute at least one high pass filtered chrominance component;

modifying the original luminance component of the color image based upon the at least one high pass filtered chrominance component using a feedback unit to create a modified luminance signal;

generating a monochrome output image directly from and based upon the modified luminance signal using an output device, high pass filtering a luminance component of the color image to compute a high pass filtered luminance component using the one or more high pass filters; and weighting the at least one high pass filtered chrominance component by a weighting factor based upon the high pass filtered luminance component using a processing unit.

2. The method of claim 1, further comprising combining, via a processing unit, multiple high pass filtered chrominance components into a single chrominance component before modifying the original luminance component.

3. The method of claim 1, wherein the weighting factor includes a sign factor, wherein the sign factor is minus one when a polarity of the high-pass filtered chrominance information is opposite that of the high-pass filtered luminance signal; and wherein the sign factor is one when the polarity of the high-pass filtered chrominance information is the same as that of the high-pass filtered luminance signal.

4. The method of claim 1, wherein the weighting factor includes a high pass filtered luminance factor based upon the magnitude of the high pass filtered luminance component.

5. The method of claim 4, wherein the high pass filtered luminance factor is small or zero when the magnitude of the high pass filtered luminance component is large and wherein the high pass filtered luminance factor is large when the magnitude of the high pass filtered luminance factor approaches zero.

6. The method of claim 1, further comprising converting information from the color image from an RGB representation to a luminance-chrominance representation using the color transformation device.

7. A method for converting a color image to a monochrome image that takes into account chrominance variations, the method comprising:

receiving the color image via an image input device;

converting the color image into an original luminance component and one or more chrominance components using a color transformation device;

high pass filtering at least one chrominance component of the color image using one or more high pass filters to compute at least one high pass filtered chrominance component;

modifying the original luminance component of the color image based upon the at least one high pass filtered chrominance component using a feedback unit to create a modified luminance signal;

generating a monochrome output image directly from and based upon the modified luminance signal using an output device, and weighting the at least one high-pass-filtered chrominance component by a weighting factor based upon a magnitude of the high pass filtered chrominance component.

8. A system for converting a color image to a grayscale image, comprising:

an image input device that receives a color image having original luminance and chrominance components;

an edge detector operably connected to the image input device, the edge detector including a high pass filter for computing high-pass filtered chrominance components from the received chrominance components;

a feedback unit operably connected to the edge detector, wherein the feedback unit modifies the original luminance component based upon the high-pass filtered chrominance components to generate a modified luminance signal;

a processing unit operably connected to and between the edge detector and the feedback unit, and an output device operably connected to the feedback unit, wherein the output device receives the modified luminance signal and outputs a grayscale image from the modified luminance signal, wherein the edge detector combines multiple high-pass filtered chrominance components into a single high-pass filtered chrominance component, wherein the edge detector is also used to compute a high pass filtered luminance component from the received luminance component; and wherein the processing unit weights the high-pass-filtered combined chrominance component based upon the high pass filtered luminance component.

9. The system of claim 8, wherein the signal comparator modifies the high-pass-filtered chrominance component;

wherein the sign factor is minus one when a polarity of the high-pass filtered chrominance information is opposite that of the high-pass filtered luminance signal; and wherein the sign factor is one when the polarity of the high-pass filtered chrominance information is the same as that of the high-pass filtered luminance signal.

10. The system of claim 8, wherein the processing unit weights the highpass-filtered combined chrominance component based upon the magnitude of the high pass filtered luminance component.

11. The system of claim 10, wherein the processing unit weights the highpass-filtered combined chrominance component such that the weighted high-pass filtered combined chrominance component is small when the high pass filtered luminance component is large, and the weighted high-pass-filtered combined chrominance component is large when the magnitude of the high-pass-filtered luminance component approaches zero.

12. The system of claim 8, further comprising a color transformation device operably connected to and between the image input device and the edge detector, wherein the color transformation device converts the color image from an RGB representation to a luminance-chrominance representation.

13. The system of claim 8, wherein the output device is a printer.

14. The system of claim 8, wherein the output device is a display screen.

15. The system of claim 8, wherein the output device is electric paper.

16. The system of claim 8, wherein the output device is a facsimile machine.

17. A method, comprising:

high pass filtering an original luminance and chrominance components of a color image using one or more high pass filters to compute high pass filtered luminance and chrominance components;

combining multiple high-pass filtered chrominance components into a single combined chrominance component using a processing unit;

weighting the combined chrominance component using the processing unit by a weighting factor based upon the high pass filtered luminance component;

modifying the original luminance component of the color image based upon the weighted combined chrominance component using a feedback unit to create a modified luminance signal; and generating a monochrome output image using an output device using the modified luminance signal.

* * * * *